(12) United States Patent  
Witschnig

(10) Patent No.: US 8,331,864 B2
(45) Date of Patent: Dec. 11, 2012

(54) RFID DEVICE, RFID SYSTEM AND SIGNAL DISTORTION PRE-COMPENSATION PROCESS IN RFID SYSTEMS

(75) Inventor: Harald Witschnig, Gratkorn (AT)

(73) Assignee: NXP B.V., Eindhoven (NL)

( * ) Notice: Subject to any disclaimer, the term of this patent is extended or adjusted under 35 U.S.C. 154(b) by 580 days.

(21) Appl. No.: 12/598,623

(22) PCT Filed: May 27, 2008

(86) PCT No.: PCT/IB2008/052072
§ 371 (c)(1),
(2), (4) Date: Nov. 3, 2009

(87) PCT Pub. No.: WO2008/146241
PCT Pub. Date: Dec. 4, 2008

(65) Prior Publication Data
US 2010/0134255 A1    Jun. 3, 2010

(30) Foreign Application Priority Data
May 30, 2007    (EP) ..................... 07109174

(51) Int. Cl.
*H04B 1/00* (2006.01)
(52) U.S. Cl. ................. 455/63.1; 455/67.13; 455/114.2; 455/501; 340/572.4
(58) Field of Classification Search .............. 455/63.1, 455/67.13, 114.2, 501, 570, 222, 226.3, 277.2, 455/278.1, 296; 340/572.4, 572.1, 568.1
See application file for complete search history.

(56) References Cited

U.S. PATENT DOCUMENTS

| | | | |
|---|---|---|---|
| 5,239,283 A | 8/1993 | Wiesgickl | |
| 7,148,804 B2* | 12/2006 | Salesky et al. | 340/572.4 |
| 7,436,164 B2* | 10/2008 | Vos | 323/293 |
| 7,546,137 B2* | 6/2009 | D'Hont et al. | 455/522 |
| 7,685,752 B2* | 3/2010 | Robadey et al. | 40/301 |
| 8,040,329 B2* | 10/2011 | Vos | 345/179 |
| 2007/0066223 A1* | 3/2007 | D'Hont et al. | 455/41.2 |
| 2009/0195366 A1* | 8/2009 | Meier et al. | 340/10.51 |
| 2010/0090804 A1* | 4/2010 | Gruber et al. | 340/10.2 |
| 2011/0084810 A1* | 4/2011 | Witschnig et al. | 340/10.1 |
| 2012/0184338 A1* | 7/2012 | Kesler et al. | 455/572 |

FOREIGN PATENT DOCUMENTS

| | | |
|---|---|---|
| EP | 0706151 A | 4/1996 |
| EP | 07104675 A2 | 9/2008 |

* cited by examiner

*Primary Examiner* — Minh D Dao

(57) ABSTRACT

In an RFID system an RFID device (2) comprises a device air interface (C2) with a predefined quality factor (Q2) for transmitting wireless carrier and data signals (CS) being transmitted to a remote RFID transponder (1) comprising a transponder air interface (C1) with a predefined quality factor (Q1). Carrier and data signal pre-compensation means (3) are arranged between the device air interface (C2) and data signal processing means (4), wherein the carrier and data signal pre-compensation means (3) are adapted to pre-compensate signal distortions of the carrier and data signals (CS) caused by the quality factors (Q2, Q1) of the device air interface (C2) and the transponder air interface (C1) of the RFID device (2) and the RFID transponder (1), respectively.

13 Claims, 4 Drawing Sheets

RFID DEVICE, RFID SYSTEM AND SIGNAL DISTORTION PRE-COMPENSATION PROCESS IN RFID SYSTEMS

FIELD OF THE INVENTION

The invention relates to an RFID device comprising a device air interface with a predefined quality factor for transmitting wireless carrier and data signals to a remote RFID transponder comprising a transponder air interface with a predefined quality factor.

The invention further relates to an RFID system comprising an RFID device and at least one RFID transponder.

The invention further relates to a process for pre-compensation distortions of wirelessly transmitted carrier and data signals in an RFID system comprising an RFID device with a device air interface for transmitting wireless carrier and data signals and at least one RFID transponder with a transponder air interface.

BACKGROUND OF THE INVENTION

In a conventional high frequency RFID system comprising at least one RFID reader and multiple RFID transponders (e.g. operating at 13.56 MHz, data transmission from the RFID transponders to the RFID reader via load modulation), a preferably high quality factor of the transponders of the RFID system is aimed to receive electric energy with a high energy level, which electric energy is transmitted from the reader to the transponders. However, disadvantageously, a very high quality factor of the transponders has a negative influence on the whole RFID system insofar, as it makes it difficult to achieve a very high data rate between the transponders and the reader. The reason for this behavior of the RFID system is that increasing the quality factor, or in other words reducing the frequency band width in respect of a given center frequency results in longer swing-out transients of various oscillating circuits employed in the RFID system.

This behavior is shown in the charts of FIGS. 1A to 1D depicting the impulse response E of data signals over time t at an air interface between the reader and the transponders. FIG. 1A shows a low data rate at a high quality factor. It will be appreciated that the envelope Env of the data signal is rather broad indicating a long swing-out transient. FIG. 1B shows a low data rate at a low quality factor resulting in a considerably shortened envelope Env of the data signal providing enough head room between the consecutive data signals for increasing the data rate as is shown in FIG. 1C. However, trying to increase the data rate at the high quality factor of FIG. 1A inevitably results in intersymbol interferences Co1 as depicted in the chart of FIG. 1D. As a consequence, in known RFID systems a compromise between an extent of the quality factor and an intended data rate between the transponder and the reader has to be made.

Further, national and international standards limit both the theoretically available frequency bandwidths and the energy levels of signals being transmitted in the RFID systems, thereby barring a possible solution of this dilemma between quality factors and data rates in RFID systems.

Nevertheless, there is a need for increasing data transmission rates in RFID systems to allow for new applications. An example of such an application might be an electronic passport where fingerprints and other biometric data stored therein have to be transferred to a reading station within the shortest time possible.

OBJECT AND SUMMARY OF THE INVENTION

It is an object of the invention to provide an RFID device of the type defined in the opening paragraph, an RFID system of the type defined in the second paragraph and a process for pre-compensating distortions of wirelessly transmitted carrier and data signals in an RFID system of the type defined in the third paragraph, in which the disadvantages defined above are avoided.

In order to achieve the object defined above, with an RFID device according to the invention characteristic features are provided so that an RFID device according to the invention can be characterized in the way defined below, that is:

An RFID device comprising a device air interface with a predefined quality factor for transmitting wireless carrier and data signals to a remote RFID transponder comprising a transponder air interface with a predefined quality factor, wherein carrier and data signal pre-compensation means are arranged between the device air interface and data signal processing means, wherein the carrier and data signal pre-compensation means are adapted to pre-compensate signal distortions of the carrier and data signals arising during transmission caused by the quality factors of the device air interface and the transponder air interface of the RFID device and the RFID transponder, respectively. In order to achieve the object defined above, an RFID system according to the invention comprises an RFID device according to the invention and at least one RFID transponder.

In order to achieve the object defined above, with a process for pre-compensating distortions of wirelessly transmitted carrier data signals in an RFID system according to the invention characteristic features are provided so that a pre-compensating process according to the invention can be characterized in the way defined below, that is:

A process for pre-compensating distortions of wirelessly transmitted carrier and data signals in an RFID system comprising an RFID device with a device air interface for transmitting wireless carrier and data signals and at least one RFID transponder with a transponder air interface, wherein the pre-compensating process comprises determining a quality factor of the device air interface of the RFID device, determining a quality factor of the transponder air interface of the RFID transponder, determining a pre-compensation function being adapted to pre-compensate signal distortions of the carrier and data signals arising during transmission to the device air interface caused by the quality factors of the transponder air interface and the device air interface and applying the pre-compensation function to the carrier and data signals to be transmitted.

The characteristic features according to the invention provide the advantage that in an RFID system with the inventive data signal pre-compensation for a given quality factor of the RFID device and also of the transponder the bandwidth limitation for data transmission can be better compensated for than with known systems. This results in higher achievable data rates compared to known systems. Further advantages are that the present solution provides higher transfer of energy from the RFID device to the RFID transponder compared to the known measure of reducing the quality factors for achieving less intersymbol interferences, that a simpler receive structure can be implemented in the RFID transponder due to the pre-compensation of distortion effects based on the quality factor, and that the burden of coping with signal processing complexity is shifted to the RFID device which is less restricted in terms of costs, complexity of the electronic circuits to be incorporated and overall-size of the device.

Very good results can be expected for the RFID device according to the invention by configuring the carrier and data signal pre-compensation means with a filter with inverse channel characteristics, e.g. having a transfer function following a Zero Forcing (ZF) Criterion, in respect of the transfer function of the air interfaces of the RFID transponder and the RFID device and optionally of an air transmission path between said air interfaces. The filter coefficients have to be calculated on the basis of either predefined parameters or an estimation of parameters.

In an alternative approach of the RFID device according to the invention the carrier and data signal pre-compensation means are configured with a transfer function following a Minimum Mean Square Error (MMSE) Criterion in respect of the transfer function of the air interfaces of the RFID transponder and the RFID device and optionally of the air transmission path. Compared with the Zero Forcing Criterion the present embodiment of the invention yields reduced noise for low frequency signals.

In an easy to implement embodiment of the invention the carrier and data signal pre-compensation means comprise a digital filter and a subsequent digital/analog converter. This embodiment provides comparably low complexity in respect of circuit design. Good filtering results can be achieved by designing the digital filter as a Finite Impulse Response filter.

Alternatively, the carrier and data signal pre-compensation means may comprise an analog filter with inverse channel characteristics. The analog filter may be configured as an active or passive filter. For instance, with an active or passive analog filter having a specific bandpass characteristic the criterion of inverse channel characteristic can be met. In one embodiment of the invention the inductance necessary for a bandpass filter may be implemented by a coil or a winding at the antenna itself.

It is preferred to configure the RFID device according to the invention either as an RFID reader or an NFC device.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 1A:
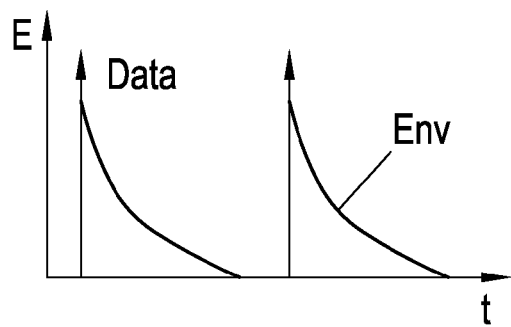
FIGS. 1A to 1D show graphs of the impulse response E of data signals over time t at an air interface between the reader and the transponders.
Figure 1B:
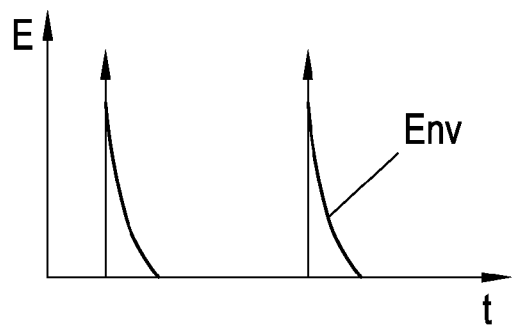
Figure 1C:
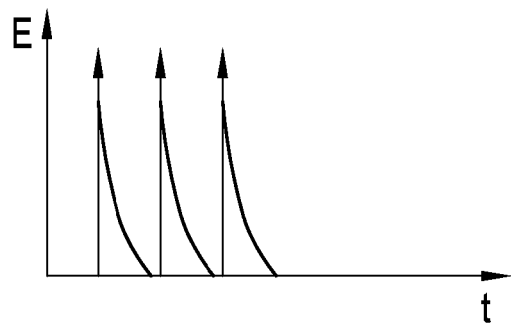
Figure 1D:
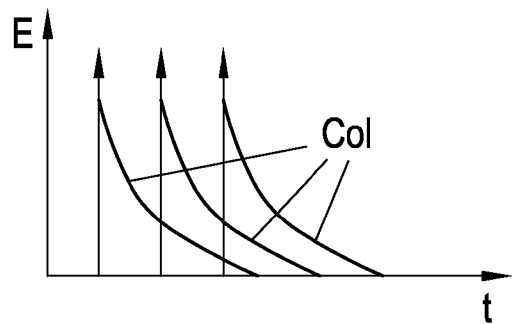
Figure 2:
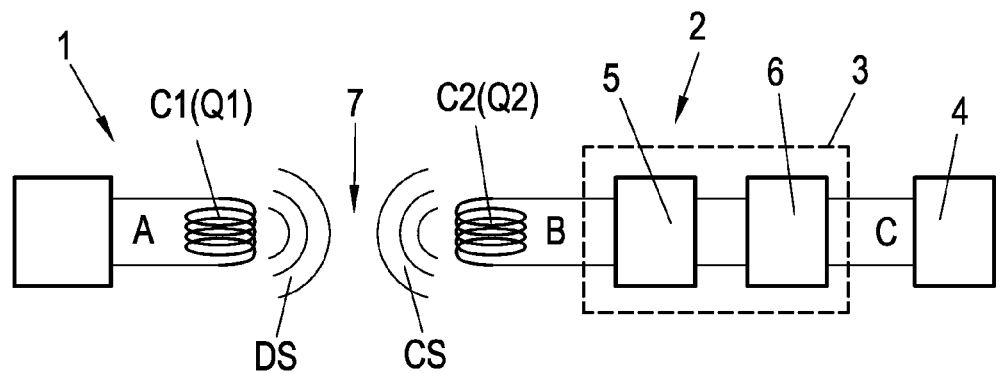
FIG. 2 shows a schematic block diagram of an RFID system according to the invention.

An implementation of the RFID system according to the invention is now explained with reference to the schematic block diagram of FIG. 2. The RFID system comprises at least one RFID transponder 1 and an RFID device 2. In this embodiment the RFID transponder 1 is configured as a passive RFID transponder, also called tag or card, being wirelessly powered by a high frequency electromagnetic field that is generated by the RFID device 2. The electromagnetic field has carrier signal waves CS having a given frequency, e.g. 13.56 MHz. It should be emphasized that as used herein the term "electromagnetic field" comprises electric, magnetic and mixed electromagnetic fields depending on the frequency of the field. In the 13.56 MHz range the magnetic field in the near field is prevailing, whereas in UHF systems between 800 and 900 MHz a mixed electromagnetic field is propagating.

Figure 4:
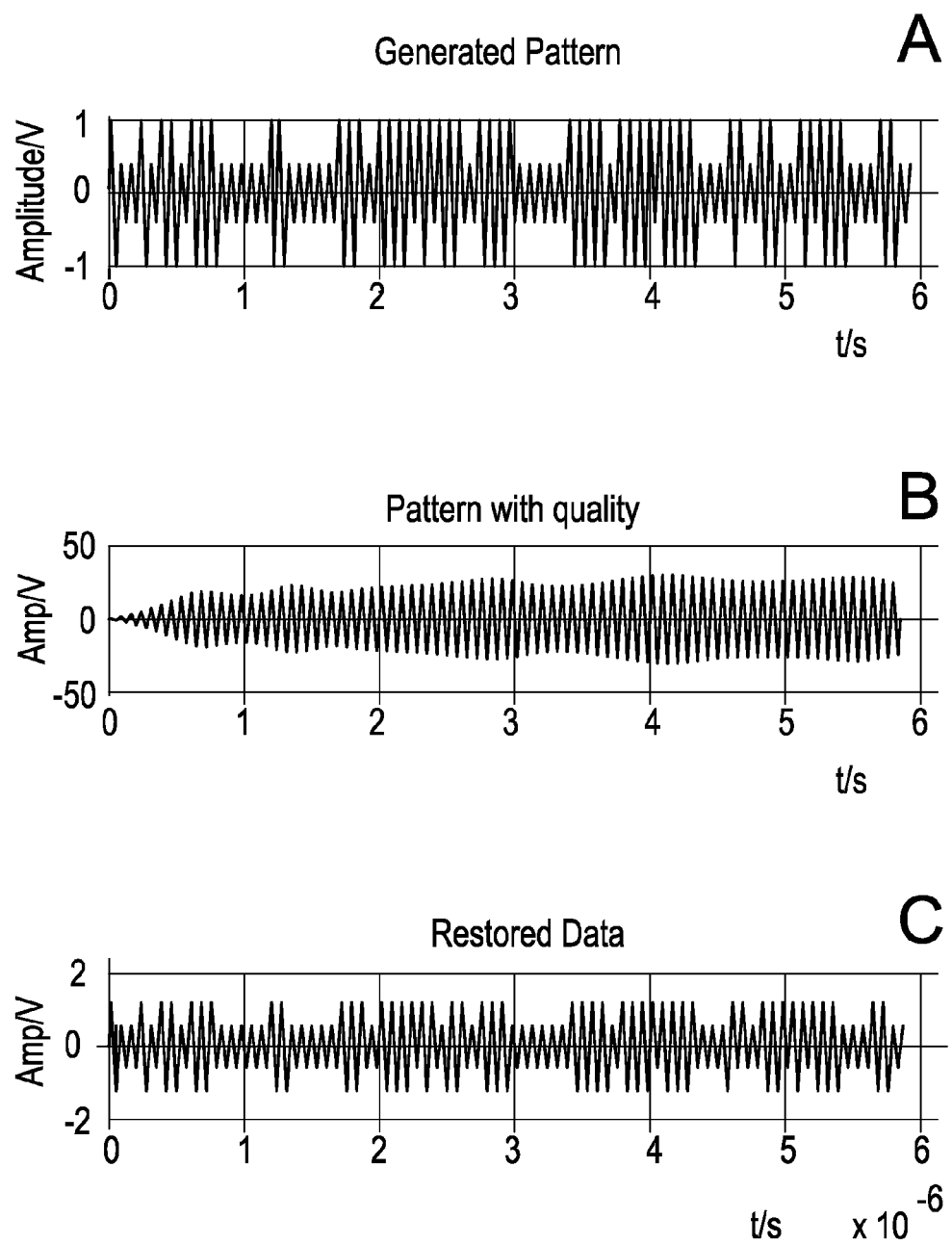
FIG. 4 shows signal timing diagrams of an undistorted data signal, a data signal distorted due to the quality factors of air interfaces and a data signal restored according to the invention, respectively.

When the RFID device 2 has to send data or instructions to the RFID transponder 1 it modulates the carrier signal waves CS in an appropriate manner, e.g. by phase modulation, such that the carrier signal waves CS are turned into a combined carrier and data signal. The RFID transponder 1 comprises a transponder air interface C1 being implemented as a coil which is adapted to receive the electromagnetic field, i.e. the carrier and data signals CS. In order to receive as much energy from the electromagnetic field as possible the transponder air interface C1 has a relatively high quality factor Q1 adjusted to the frequency of the carrier and data signal CS. The RFID transponder 1 is further adapted to transmit data signals DS via the transponder air interface C1 by means of load modulating the carrier and data signals CS of the received electromagnetic field. A typical signal sequence of the data signals DS appearing at the transponder air interface C1 is shown in line A of the signal timing diagram of FIG. 4. It will be appreciated that it reveals a typical clean load modulation signal sequence.

The RFID device 2 is configured as an RFID reader. It comprises a device air interface C2 with a predefined high quality factor Q2 for both transmitting the high frequency electromagnetic field, i.e. the carrier and data signals CS and receiving wireless data signals DS from the remote RFID transponder 1. It should be noted that in the present embodiment the data rate within the data signals DS is set to a high level that goes beyond present standards for 13.56 MHz RFID systems. The effects of the high data rate in combination with the high quality factors Q1, Q2 of the transponder air interface C1 and the device air interface C2 on data signals DS being sent from the RFID transponder 1 to the RFID reader 2 are illustrated in line B of the signal timing diagram of FIG. 4 which reveals the signals received by the device air interface C2. It will be appreciated that the signals are completely distorted so that the data comprised therein are not any longer recognizable as load modulated data bits. It should be noted that distortion of signals due to high quality factors does not only appear for load modulated signals in direction from the RFID transponder 1 to the RFID device 2, but affects in the same manner all data being sent from the RFID device 2 to the RFID transponder 1, wherein these data are e.g. transmitted by means of amplitude modulation or phase modulation.

In order to cope with the problem of signal distortion the inventor has suggested in the co-pending EP patent application 07104675 which has not yet been published to provide data signal equalization means arranged between the device air interface C2 of the RFID device 2 and data signal processing means 4, wherein the data signal equalization means are adapted to compensate signal distortions of the data signals (DS) caused by the quality factors Q2, Q1 of the device air interface C2 and the transponder air interface C1 of the RFID device 2 and the RFID transponder 1, respectively. The positive impact of equalizing the distorted data signal DS according to this suggestion is shown in line C of the timing diagram of FIG. 4. It will be appreciated that the load modulated data bits within the signal sequence have been restored to such an extent that they can easily be processed by the data signal processing means 4.

Figure 5:
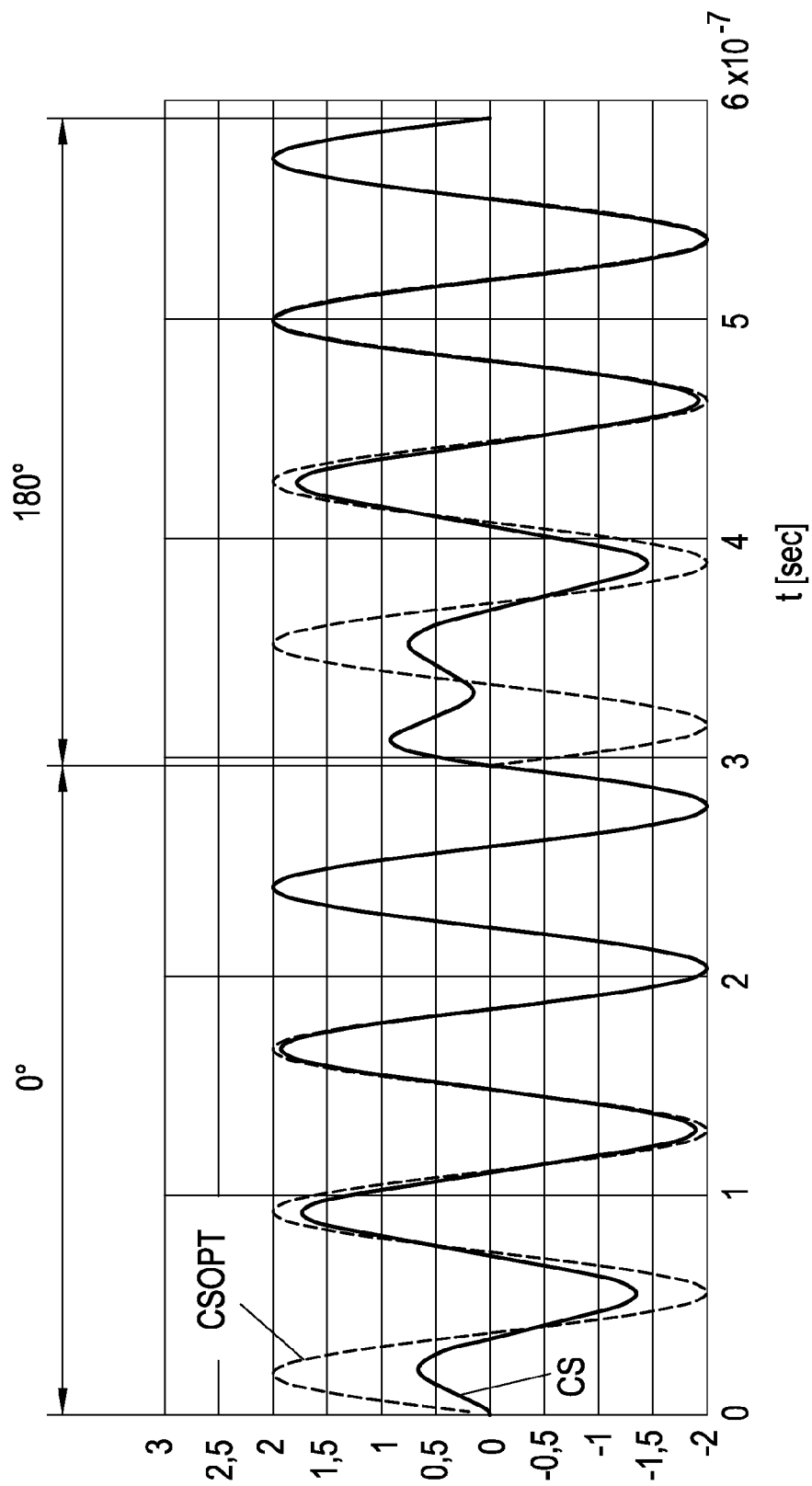
FIG. 5 shows signal timing diagrams of a distorted carrier and data signal received by an RFID transponder and of an ideal non-distorted carrier and data signal as it should be received by the RFID transponder.

As mentioned above, distortion of data signals caused by the quality factors of the respective air interfaces is not only a problem of data transmission from the RFID transponders 1 to the RFID device 2, but affects in the same manner the transmission of carrier and data signals CS from the RFID device 2 to the RFID transponders 1. It applies to data transmission in both directions that the quality factors Q1, Q2 of the transponder air interface C1 and the device air interface C2 contribute to an overall quality factor Q of a signal transmission path that also includes an air transmission path 7 between the two air interfaces C1, C2. The resulting transfer function H(f) is shown in the Bode diagram of FIG. 3. It will be recognized that this transfer function H(f) is responsible for both the heavy signal distortions to the data signal DS shown in line B of FIG. 4 and signal distortions to the carrier and data signal CS. For example, FIG. 5 shows signal timing diagrams of a distorted carrier and data signal CS received by the RFID transponder 1 and of an ideal non-distorted carrier and data signal CSOPT as it should be received by the RFID transponder 1. The carrier and data signal CS generated by the RFID device 2 is a phase modulated signal wherein changes between the logical signal levels 0 and 1 and vice versa result in phase shifts of the carrier signal wave by 180°. However, due to the effect of the quality factor the carrier and data signal CS actually received by the RFID transponder 1 has been considerably distorted. Particularly, the quality factor has caused an unwanted amplitude modulation that results in a reduced transfer of energy. In order to compensate that effect it is suggested to pre-compensate the carrier and data signal after its generation in the data processing means 4 by carrier and data signal pre-compensation means 3 being arranged between the data processing means 4 and the device air interface C2. The carrier and data signal pre-compensation means 3 follow a pre-compensation criterion that provides pre-compensation of the carrier and data signals CS such that the influence of the high quality factors Q1, Q2 of the air interfaces C1, C2 will result in an equalization of the pre-compensated carrier and data signal CS close to the ideal signal CSOPT.

In a first approach the carrier and data signal pre-compensation means 3 have a transfer function E(f) following a Zero Forcing (ZF) Criterion in respect of the transfer function H(f) of the air interfaces C1, C2 of the RFID transponder 1 and the RFID device 2 and optionally of the air transmission path 7. Applying a Zero Forcing (ZF) Criterion means that the pre-compensating transfer function E(f) is calculated as $$E(f)=1/H(f)$$

Figure 3:
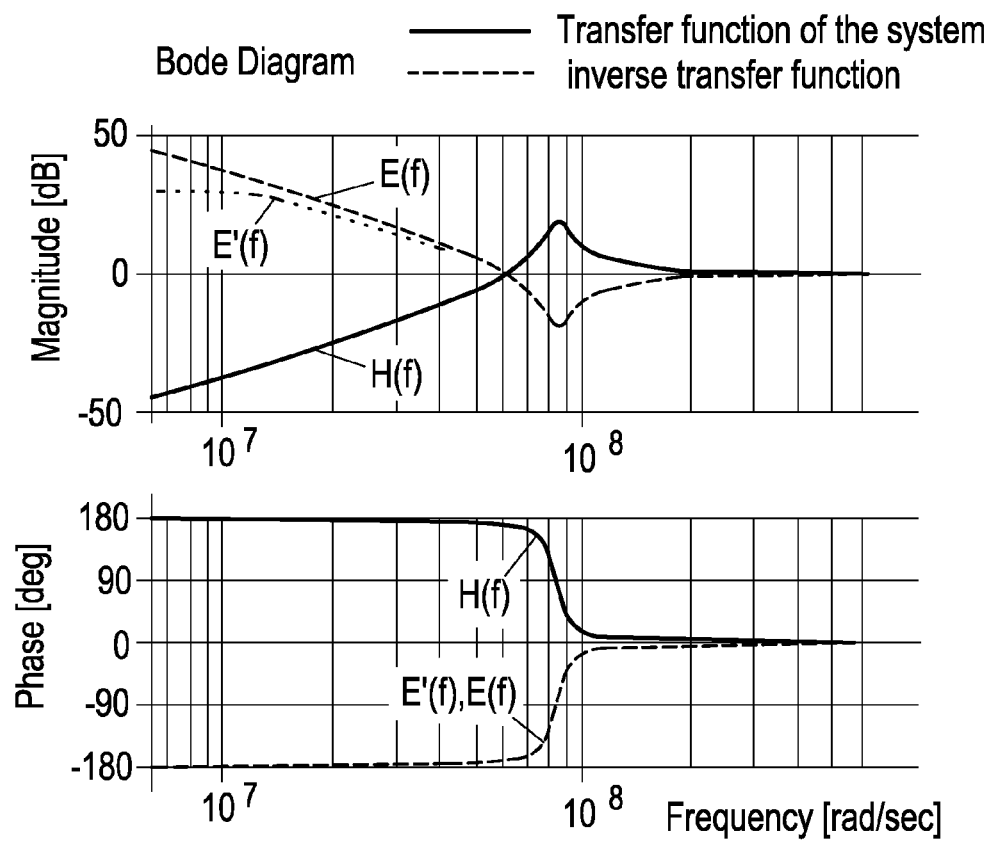
FIG. 3 shows Bode diagrams of the data signal transmission path and various equalizing criterions.

The pre-compensating transfer function E(f) is depicted in the Bode diagram of FIG. 3. In theory it fully linearizes the transfer function H(f). However, in practice applying the Zero Forcing (ZF) Criterion may cause signal noise at lower signal frequencies due to the high signal gain at said lower frequencies. Hence, it may be advantageous to apply a different pre-compensating criterion, e.g. a Minimum Mean Square Error (MMSE) Criterion, resulting in a transfer function E'(f) of the carrier and data signal pre-compensation means 3 that is also shown in the Bode diagram of FIG. 3. Calculating the Minimum Mean Square Error (MMSE) Criterion is well known to those skilled in the art. The result is a signal that has a slight distortion over the entire frequency bandwidth but with a very low noise portion of the signal.

In the present embodiment the carrier and data signal pre-compensation means 3 comprise a digital filter 6 and a digital/analog converter 5, wherein the digital filter 6 is designed as a Finite Impulse Response FIR filter. However, such a filter design is not mandatory and other filter designs may also be applicable, for instance an analog filter with an inverse channel characteristics.

It should be observed that although in the present embodiment of the invention the RFID device 2 has been configured as an RFID reader it is nevertheless also be configurable as an NFC device.

The invention claimed is:

1. An RFID device comprising a device air interface with a predefined quality factor for transmitting wireless carrier and data signals to a remote RFID transponder comprising a transponder air interface with a predefined quality factor, wherein carrier and data signal pre-compensation means are arranged between the device air interface and data signal processing means, wherein the data signal pre-compensation means are adapted to pre-compensate signal distortions of the carrier and data signals arising during transmission caused by the quality factors of the device air interface and the transponder air interface of the RFID device and the RFID transponder, respectively.

2. The RFID device as claimed in claim 1, wherein the carrier and data signal pre-compensation means comprise a filter with inverse channel characteristics, e.g. having a transfer function following a Zero Forcing Criterion, in respect of the transfer function of the air interfaces of the RFID transponder and the RFID device and optionally of an air transmission path between said air interfaces.

3. The RFID device as claimed in claim 1, wherein the carrier and data signal pre-compensation means have a transfer function following a Minimum Mean Square Error (MMSE) Criterion in respect of the transfer function of the air interfaces of the RFID transponder and the RFID device and optionally of the air transmission path.

4. The RFID device as claimed in claim 1, wherein the carrier and data signal pre-compensation means comprise a digital filter and a digital/analog converter.

5. The RFID device as claimed in claim 4, wherein the digital filter is designed as a Finite Impulse Response filter.

6. The RFID device as claimed in claim 1, wherein the carrier and data signal pre-compensation means comprise an analog filter, e.g. an analog filter with an inverse channel characteristics.

7. The RFID device as claimed in claim 1, being configured either as an RFID reader or an NFC device.

8. An RFID system comprising an RFID device as claimed in claim 1 and at least one RFID transponder.

9. A process for pre-compensating distortions of wirelessly transmitted carrier and data signals in an RFID system comprising an RFID device with a device air interface for transmitting wireless carrier and data signals and at least one RFID transponder with a transponder air interface, wherein the pre-compensating process comprises determining a quality factor of the device air interface of the RFID device, determining a quality factor of the transponder air interface of the RFID transponder, determining a pre-compensation function being adapted to pre-compensate signal distortions of the carrier and data signals arising during transmission to the device air interface caused by the quality factors of the transponder air interface and the device air interface and applying the pre-compensation function to the carrier and data signals to be transmitted.

10. The pre-compensation process as claimed in claim 9, wherein the pre-compensation function has inverse channel characteristics.

11. The pre-compensation process as claimed in claim 9, wherein the equalization function is determined to have a transfer function following a Minimum Mean Square Error Criterion in respect of the transfer function of the air interfaces of the RFID transponder and the RFID device and optionally of the air transmission path.

12. The pre-compensation process as claimed in claim 9, wherein the pre-compensation process is carried out by digital filtering of the carrier and data signals and subsequent digital/analog conversion.

13. The pre-compensation process as claimed in claim 9, wherein the pre-compensation process is carried out by digital/analog conversion and subsequent analog filtering with an inverse channel characteristics

* * * * *